United States Patent [19]

Jacob et al.

[11] 4,262,212

[45] Apr. 14, 1981

[54] AUTOMATIC POWER CONTROL CIRCUIT FOR RECREATIONAL VEHICLE OR THE LIKE

[75] Inventors: Allan S. Jacob, Rochester; Andrzej Zawadzki, Birmingham, both of Mich.

[73] Assignee: Ram Meter, Inc., Troy, Mich.

[21] Appl. No.: 3,528

[22] Filed: Jan. 15, 1979

[51] Int. Cl.³ .......................... H02J 3/00; H02J 9/00
[52] U.S. Cl. .......................... 307/9; 307/65; 307/67; 307/68
[58] Field of Search .................. 307/9, 10 R, 64, 65, 307/66, 67, 68, 45, 46, 47, 48, 31, 70, 80, 85, 86, 41, 32

[56] References Cited

U.S. PATENT DOCUMENTS

| | | | |
|---|---|---|---|
| 2,316,331 | 4/1943 | Hedding | 307/46 |
| 3,456,119 | 7/1969 | Schneider | 307/10 R X |
| 3,519,843 | 7/1970 | Trautman | 307/65 |
| 3,668,514 | 6/1972 | Peck | 307/10 R X |
| 3,808,451 | 4/1974 | Pittet | 307/64 |
| 4,034,233 | 7/1977 | Leyde | 307/41 |
| 4,044,268 | 8/1977 | Hammel et al. | 307/66 |
| 4,127,782 | 11/1978 | Omura et al. | 307/66 X |

Primary Examiner—L. T. Hix
Assistant Examiner—James L. Dwyer
Attorney, Agent, or Firm—Harness, Dickey & Pierce

[57] ABSTRACT

A control circuit for automatically controlling and transferring various power sources for a recreational vehicle or the like. More particularly, the system responds to various load demands, contingencies and conditions to control and transfer the power supplied to the recreational vehicle between a land line, a motor generator, and an inverter.

14 Claims, 15 Drawing Figures

FIG. 6A.

Battery Sensors

FIG. 6B.

Proportional Power Limiter

Sensing Current

AUTOMATIC POWER CONTROL CIRCUIT FOR RECREATIONAL VEHICLE OR THE LIKE

BACKGROUND AND SUMMARY OF THE INVENTION

Recreational vehicles are often supplied with three power sources, (1) a land line which is connected to the recreational vehicle to supply the vehicle with power from existing facilities at a campsite or the like, (2) a motor generator which is carried by the vehicle and which is normally operated from the same fuel source as the motor vehicle, and (3) an inverter which converts 12 volt DC battery power to 110 volt AC power. In the past, various systems have been provided for automatically operating motor generators and inverters which use sensing signals for detecting a load. However, the known prior art systems are not believed to fully account for all the various contingencies of operation of the various power supplies of a recreational vehicle to automatically connect and control the power supplies in a manner which will provide optimum convenience to the recreational vehicle user.

The present system is particularly suitable for use with a recreational vehicle using a generator powered by a stirling-cycle engine. Such generators are now being introduced to the recreational vehicle industry and are expected to substantially change the manner in which recreational vehicle motor generators are used. More particularly, the efficiency and low noise level of a stirling-cycle engine is conducive to much more extensive uses of the motor generator. For example, stirling-cycle motor generators may be used in circumstances in which motor generators heretofore would not be used due to the noise and cost of operation of same. As a more specific example, in quiet campsites and the like, it is generally considered impolite to indiscriminately operate a motor generator. However, with such stirling-cycle engines, the operation of a motor generator under those circumstances would not appear to be objectionable.

The power control and transfer system of the present invention is therefore well suited for use with stirling-cycle motor generators so that the capabilities of such generators can be fully exploited. The control system of the present invention is capable of switching between three available power supplies of the vehicle, the land line, the motor generator and the inverter to meet certain operating conditions and contingencies and to provide optimum convenience to the recreational vehicle user. As will be apparent from the Detailed Description Of The Preferred Embodiment, the system generally establishes a priority of use in the following order:
 (1) land line,
 (2) inverter,
 (3) motor generator.

BRIEF DESCRIPTION OF THE DRAWINGS

FIG. 3 is a schematic diagram of the timer circuits of the control system of the present invention;

DETAILED DESCRIPTION OF THE PREFERRED EMBODIMENT

Figure 1:
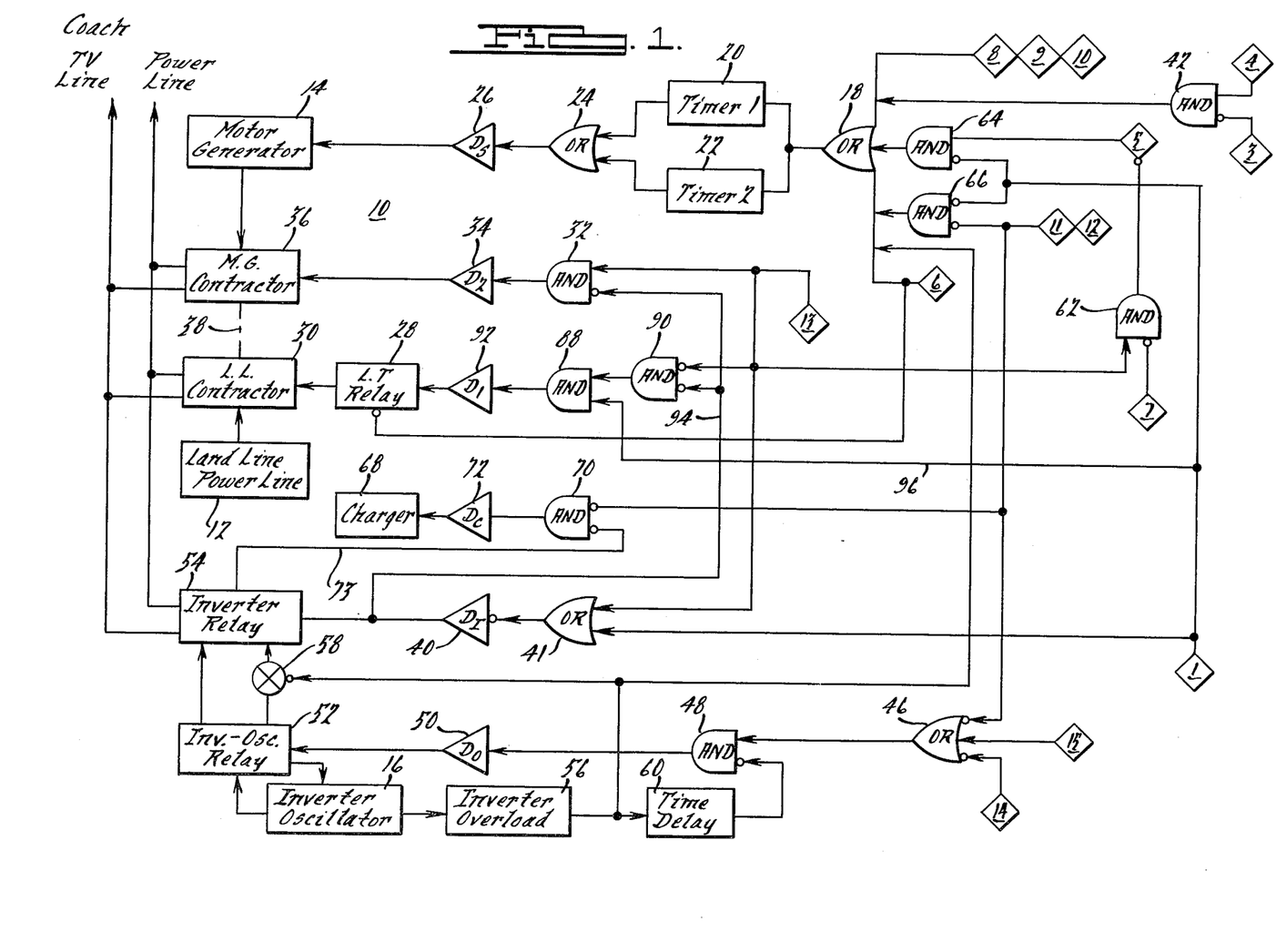
FIG. 1 is a block diagram of the logic circuitry of the control system according to the present invention.

In FIG. 1, the logic of the control system 10 according to the present invention is illustrated. The figure also illustrates the principal power inputs to the recreational vehicle or other using facility. Particularly, the vehicle is provided with a land line input 12, a motor generator 14 and an inverter/oscillator 16. It is the function of the system 10 to control the three power sources 12-16 in accordance with certain demands and other function and criteria as will be explained.

For the purpose of explaining the system 10, it shall first be assumed that the recreational vehicle is connected with both the upper and lower halves of a three-wire AC land line. In this regard, such a three-wire power line is known to include a line L2, a line L1 and a line N. The line N is the neutral line. The line L2 has a 110/120 volt differential with respect to line N and the line L1 also has a 110/120 volt differential with respect to the line N. The AC voltage waveforms of lines L1 and L2 is such that there is a 220/240 volt difference between the lines L1 and L2. The land line is normally capable of supplying fifteen to thirty amperes of current. The motor generator, on the other hand, is capable of supplying up to sixty amperes of current, e.g., thirty amps to each line L1 and L2.

With reference to FIG. 1, presuming that both the upper and lower land lines are connected to the recreational vehicle, the power used by the recreational vehicle will normally be supplied by the land line. Should, however, a demand be placed on the power supply of the recreational vehicle which exceeds a preset amount. The system 10 will automatically convert to motor generator operation. This is accomplished as follows. The system 10 includes a power demand sensor 6 which is responsive to the power demand of all of the electrical appliances and devices in the recreational vehicle. Preferably, this device is user-setable to a power level which corresponds to the land line capability of the land line then in use. For example, certain land lines will be fused for twenty amperes maximum current, others may be fused to thirty amperes maximum current, etc. It is desirable that the recreational vehicle power demand does not exceed the fused level of the land line power supply so that fuses or tripped. It will be appreciated that the blowing of fuses or tripping of circuit breakers which are external to the vehicle could cause inconvenience especially if they are located any significant distance from the vehicle or if the weather is inclement. Consequently, the system 10 is programmed or preset by the user so as to respond to the maximum current level capability of the land line power supply so that the land line may be disconnected before that level is exceeded and before any exterior fuse or circuit breaker interrupted. The presetting function is now manually accomplished. However, it may be automatically accomplished by a system which responds to the configuration of the land line power cord socket.

When the sensor 6 senses a load demand in excess of the setting correlative to the maximum land line capability, a signal is sent from the sensor 6 to OR gate 18 which in turn delivers a signal to a first timer 20 and a second timer 22. The function of the timers will be explained below. The timers, in turn, immediately provide a signal to an OR gate 24. The OR gate 24 is connected to a driver 26 which responds to the signal from the OR gate 24 to command the motor generator 14 to begin its operating cycle. The excess demand sensor 6 is also connected to provide its signal to a load transfer relay 28 which in turn is connected to a land line contactor 30. When the load transfer relay 28 receives a signal indicating an excessive load demand, the load transfer relay 28 de-energizes the land line contactor to open the land line circuit, i.e., to disconnect same. In the particular circuit disclosed, the load transfer relay 28 is energized in the absence of a signal from the excess load sensor 6 such that the existence of an excess load signal causes the load transfer relay 28 to de-energize thereby allowing the land line contactor 30 to open.

In view of the above description, it can be seen that an excess load demand in the recreational vehicle results in the disconnection of the land line and a command to the motor generator 14 to begin its operating cycle. As will be described hereinafter, the system 10 also contains a provision for connecting a special low current TV/priority line to an inverter so that TV operation is not interrupted on a load transfer of the nature described above.

With more particular regard to the timers 20 and 22, the first timer is set for a relatively short period of time, for example, five minutes, whereas the second timer is set for a relatively longer period of time, for example, fifteen minutes. The first timer is designed to begin its time period at the end of a motor generator demand signal from the OR gate 18, while the second timer 22 is set to initiate its time period at the inception of a demand signal from the OR gate 18. Consequently, the function of the first timer 20 is to assure that the motor generator 14 operates for the period of the first timer 20, e.g., five minutes, after the last demand supplied by the OR gate 18. The function of the second timer 22 is to assure that the motor generator 14 runs for at least the period of the second timer 22, e.g., fifteen minutes. It will be appreciated that these periods may be modified to suit the particular needs of motor generator operation.

With regard to the time periods selected, the time period of the first timer 20 is selected to avoid constant cycling on and off of the motor generator 14 as a result of intermittent loads. By way of example, a coffee pot or appliance heater often has a thermostat switch which cycles on and off to maintain a given temperature. Turning the generator off and on with each such cycle should be avoided. Consequently, the time period of the first timer 20 is designed to keep the motor generator 14 running between normal on/off cycles of such heaters and the like. At the present time, a time period of five minutes is believed to be sufficient. The second timer 22 is provided to assure a minimum run time of the motor generator 14. It is believed that a motor generator 14 should be run for a minimum period of time to alloy warm-up and stabilization. Generally, short periods of operation of the motor generator is believed to be detrimental to the motor generator. Therefore, the period of timer 22 is selected to assure a minimum run time of the motor generator 14 consistent with good practices with respect to the operation of such motor generators.

The present intended use of the control system 10 is in connection with a recreational vehicle which uses a stirling-cycle engine for the motor generator power plant. In this intended use, the stirling-cycle engine also serves as the heat source for the recreational vehicle. Particularly, when a demand for heating is made by a wall thermostat 10, the stirling-cycle engine of the motor generator 14 is started. The "cooling" system of the stirling-cycle engine is connected to the heat supply of the recreational vehicle so that the heat output of the stirling-cycle engine is used for area or air heating of the recreational vehicle. Consequently, when a demand for heat is made by the wall thermostat 10, a signal therefrom is provided to the OR gate 18 which in turn provides a signal via the timers 20 and 22, the OR gate 24, and the driver 26 which starts the cycle of the motor generator 14. This operation occurs notwithstanding the fact that the land lines are connected and the electrical demands of the recreational vehicle are within the preset amount.

To continue the description of the operation of the system 10, consider the situation when the recreational vehicle is connected to a two-wire land line. Such a connection would be between the line N and the lower vehicle line L1. With such connection, the operation of the system 10 in the event of a power demand that exceeds the preset level at sensor 6 is the same as described above. However, should the recreational vehicle user place a demand on an appliance or electrical device which is connected to the upper vehicle line, i.e., between line L2 and line N, an upper vehicle line sensor 9 detects the demand. Since there is no upper vehicle line power received from the land line, the sensor 9 provides a signal to the OR gate 18 which in turn provides a signal through timers 20 and 22, OR gate 24 and driver 26 to begin the operation of the motor generator 14. The motor generator 14 will then provide power to both the upper and lower vehicle lines to run any appliances or electrical devices connected to either of the lines. The manner in which a power demand is detected will be described hereinafter.

Proper operation of the motor generator is detected by a motor generator sensor 13 which is responsive to the speed and temperature of the engine, in this case a stirling-cycle engine. When proper speed and temperature conditions are detected by the sensor 13, a signal is provided therefrom through AND gate 32 and driver 34 to operate the motor generator contactor 36. When the motor generator contactor 36 is operated, the motor generator output lines are connected to the input of the recreational vehicle. It should be noted that the motor generator contactor 36 is mechanically and electrically interlocked by interlock means 38 to a land line contactor 30 which allows only the motor generator contacts or the land line contacts to be engaged, but not both. Hence, when the motor generator contactor is engaged in response to sensor 13, the land line contactor 30 is automatically interrupted. It should be noted that the AND gate 32 receives an inverted input from an inverter relay driver 40 which enables the motor generator contactor to be closed when the inverter 16 is not in operation. A further explaination of this feature appears hereinbelow.

In the event that the power demand on the upper line is removed, motor generator operation will be terminated under the control of timers 20 and 22, as previously explained, and the land line contactor will be re-engaged. This occurs because the signal from upper land line detector 9 will terminate to deprive the OR gate 18 of its signal. It should be noted, however, that the motor generator 14 will continue in operation after discontinuance of the upper line load if the excess demand detector 6 has detected a demand above the preset level. In this regard, the excess demand detector 6 operates independently of the upper land line load detector 9 and so can provide an independent signal to the OR gate 18 to continue the operation of the motor generator 14.

Considering now the situation in which the recreational vehicle has been connected to a two-wire land line supplying power only to the lower line L1, and presuming that for some reason such as a heat demand or an excess load, the motor generator 14 has come into operation to supply power to both the upper line L2 and the lower line L1, it is possible that the recreational vehicle user will engage an electrical load on the upper line L2. Should the original conditions for causing the operation of the motor generator 14 then terminate, which termination would ordinarily cause the motor generator 14 to shut down and the land line to be re-engaged via the land line contactor 30, the motor generator will not be shut down. In this regard, since an electrical load has been placed on the upper land line L2, it is important not to disconnect that load by a transfer from the motor generator 14 to the land line 12. This function is provided by an upper vehicle line current sensor 4, an upper land line voltage sensor 3, and an AND gate 42. The circuit consisting of the AND gate 42 and the sensors 3 and 4 responds to the use of the upper land line L2 during motor generator operation so that the motor generator 14 will not be turned off when the vehicle is connected to a two-wire land line. Particularly, when the sensor 4 detects that the upper vehicle line L2 has a load current and the sensor 3 detects that there is no voltage on the upper line L2 of the land line 12, signals are provided to the AND gate 42 which provides a signal to the OR gate 18 which causes the motor generator 14 to continue to operate. In this manner, interruption of the electrical device on the upper line L2 does not occur even though the conditions which originally caused the start-up of the motor generator 14 have dissipated.

Presuming now the condition where the recreational vehicle is not connected to a land line 12, e.g., at a remote or undeveloped campsite, the operation of the system 10 will be further explained. In that case, the recreational vehicle must subsist on its own internal power supplies.

In general, the system 10 provides for preferential operation of the inverter/oscillator 16 over the motor generator 14 on the theory that operation with the inverter/oscillator 16 for modest power demands is more economical than operation of the motor generator 14. The inverter/oscillator 16 has two main subcomponents. The first is the inverter which is capable of providing up to three amps of AC power at 110/120 volts and the second is an oscillator which provides a nominal voltage of 110/120 volts but is capable of supplying very little current. The oscillator portion of the inverter/oscillator 16 is used to sense demands for electrical power. A demand sensing circuit is provided since an inverter which is capable of supplying three amps AC has a significant idle power draw or quiescent power requirement, i.e., when it is operating without a load connected to the inverter. Therefore, it is not desirable to allow the inverter portion of the inverter/oscillator 16 to operate full time. In lieu of full time operation of the inverter portion of the inverter/oscillator 16, the oscillator portion operates a signal to the line L1 and the TV/priority line to sense a load demand. Since the oscillator portion is capable of only a relatively small current, its quiescent power demand is correspondingly small. Therefore, it will be appreciated that, in the event that the recreational vehicle is not connected to a land line, and yet no demand for power has been made, only the oscillator portion of the inverter/oscillator 16 is operational. The oscillator is connected between L1 and N and also between the TV/priority line and N. Notwithstanding the fact that the oscillator is not connected to the upper line L2, it is still capable of sensing a load on the upper line L2 by the sensing arrangement illustrated in FIG. 2. Specifically, load sensors 8 and 9 are connected in voltage divider form between line L1 and line N with the midpoint of the voltage divider being at line L2. Since the oscillator portion of the inverter/oscillator 16 provides 110/120 volts to the ends of the voltage divider, i.e., the connections at L1 and N, and since there is a total of 110 volts across the voltage divider consisting of sensors 8 and 9, there is 55 volts across each sensor 8 and 9. In this regard, note that the center tap of the voltage divider, line L2, is at the midpoint of the 110 volt division. Should there be a load on the upper line between line L2 and N, the load partially shunts the voltage divider portion consisting of sensor 9. This shunting of that portion of the voltage divider unbalances the voltage division between the sensor 8 and the sensor 9, which unbalance is detected as indicative of a load on the upper line between lines L2 and N. Should there be a load placed between lines L1 and L2, i.e., a 220 volt load, the balance will also be upset by the shunting of a portion of the oscillator supply voltage through that 220 volt load. This unbalance is detected as an indication of the load across lines L1 and L2. As to loads between lines L1 and N, a separator sensor 14 is provided which is connected directly to the inverter/oscillator output. Notice that the sensor 14 for the lower line L1 is also connected to the TV/priority line through the relay operated switch portion 54a of switch 54. Consequently, it will be understood that the system 10 includes a provision for monitoring a load between the lower line L1 and line N, between the upper line L2 and the line N, between the lines L1 and L2, and between the TV/priority line and N. As previously explained, if a load is sensed between line L2 and N, or between lines L2 and L1, a signal to the motor generator is provided to the OR gate 18 via sensors 8 or 9. However, if the load that is sensed is only on the lower line L1 or the TV/priority line, the motor generator is not started. Particularly, with reference to FIG. 2, it can be seen that such a load would be detected by sensor 14 which is connected to an OR gate 46. It should be noted that the sensor 14 provides a signal when the oscillator is operating so long as a load is not connected. When a load is connected, the oscillator output is shunted through the load to reduce the signal from sensor 14. Consequently, the sensor 14 is connected to a NOT input of the OR gate 46 so that the OR gate 46 provides a signal whenever the signal from the sensor 14 is reduced to indicate a load on the line L1 or the TV/priority line. The signal from the OR gate 46 is provided to an AND gate 48, and in turn, to a driver 50 for the inverter/oscillator relay 52. When the signal is provided to the driver 50, the inverter/oscillator relay 52 is engaged to convert the inverter/oscillator 16 to inverter operation and to connect the output of the inverter/oscillator 16 to the inverter relay 54. With such connection, the inverter/oscillator will supply power to the recreational vehicle.

With reference again to FIG. 2, an inverter current sensor 15 is provided in the inverter output line to sense the existence of a current from the inverter. This current sensor 15 is connected to the OR gate 46 so as to keep the inverter operating during the existence of an output current from the inverter. Should all loads be disconnected from the inverter, the sensor 15 will no longer sense a current so as to cause the signal from the OR gate 46 to the AND gate 48 and the driver 50 to terminate thereby terminating the operation of the inverter/oscillator 16. Upon such termination, the inverter/oscillator automatically converts to the oscillator mode.

Figure 2:
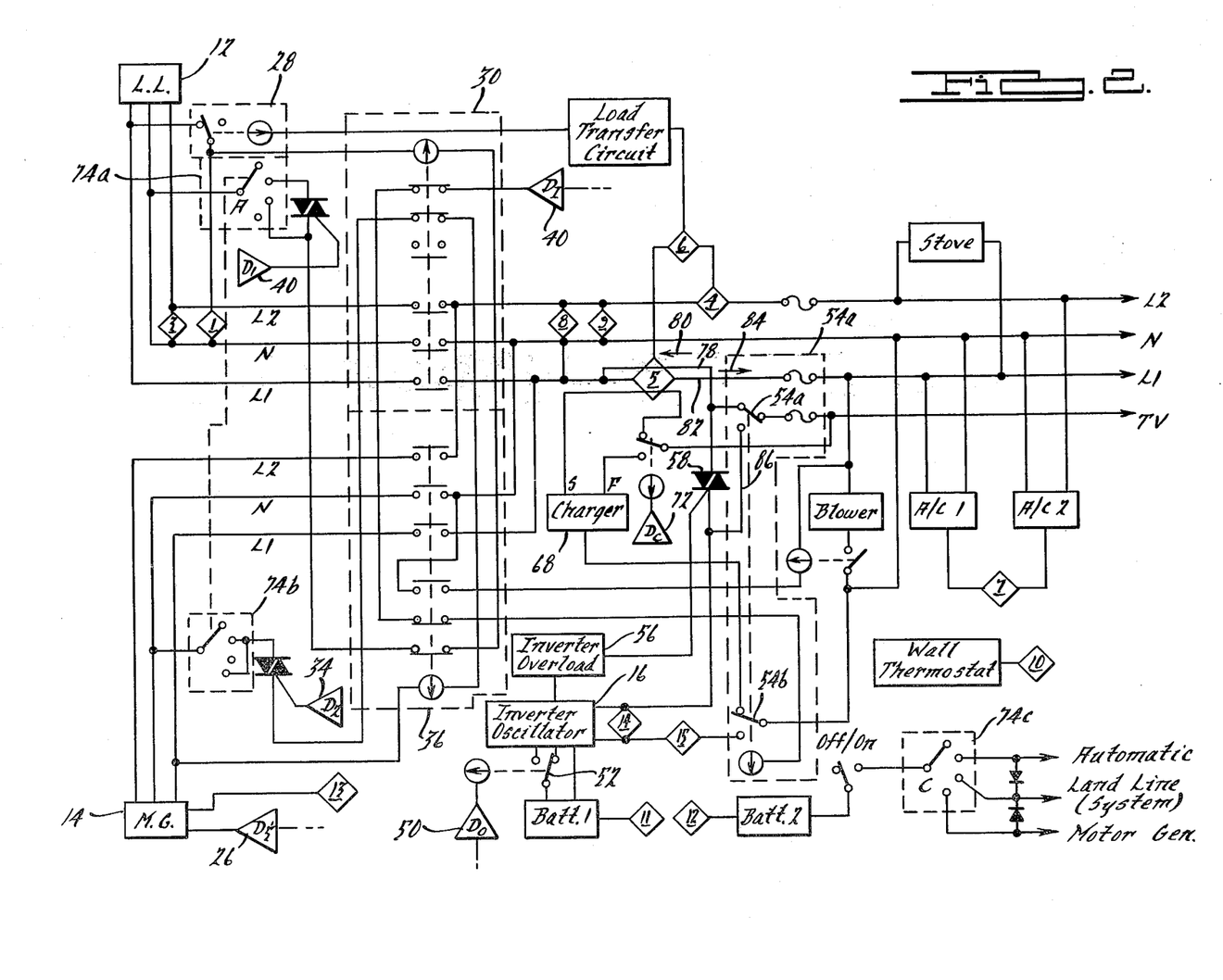
FIG. 2 is a partially logic and partially circuit diagram of the logic circuitry of the control system according to the present invention.
Figure 4:
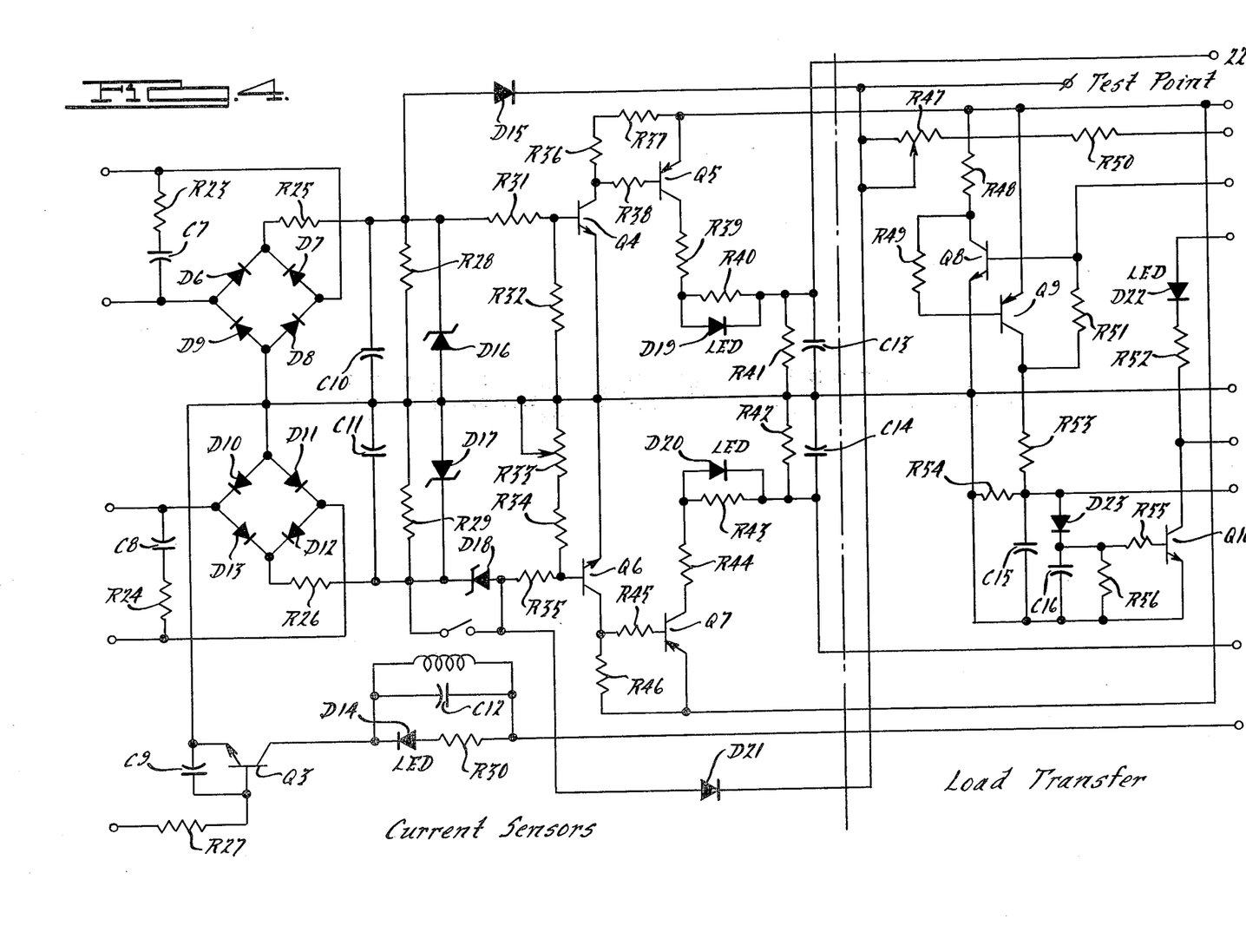
FIG. 4 is a circuit diagram of the current sensors and load transfer circuit of the control system of the present invention.
Figure 5:
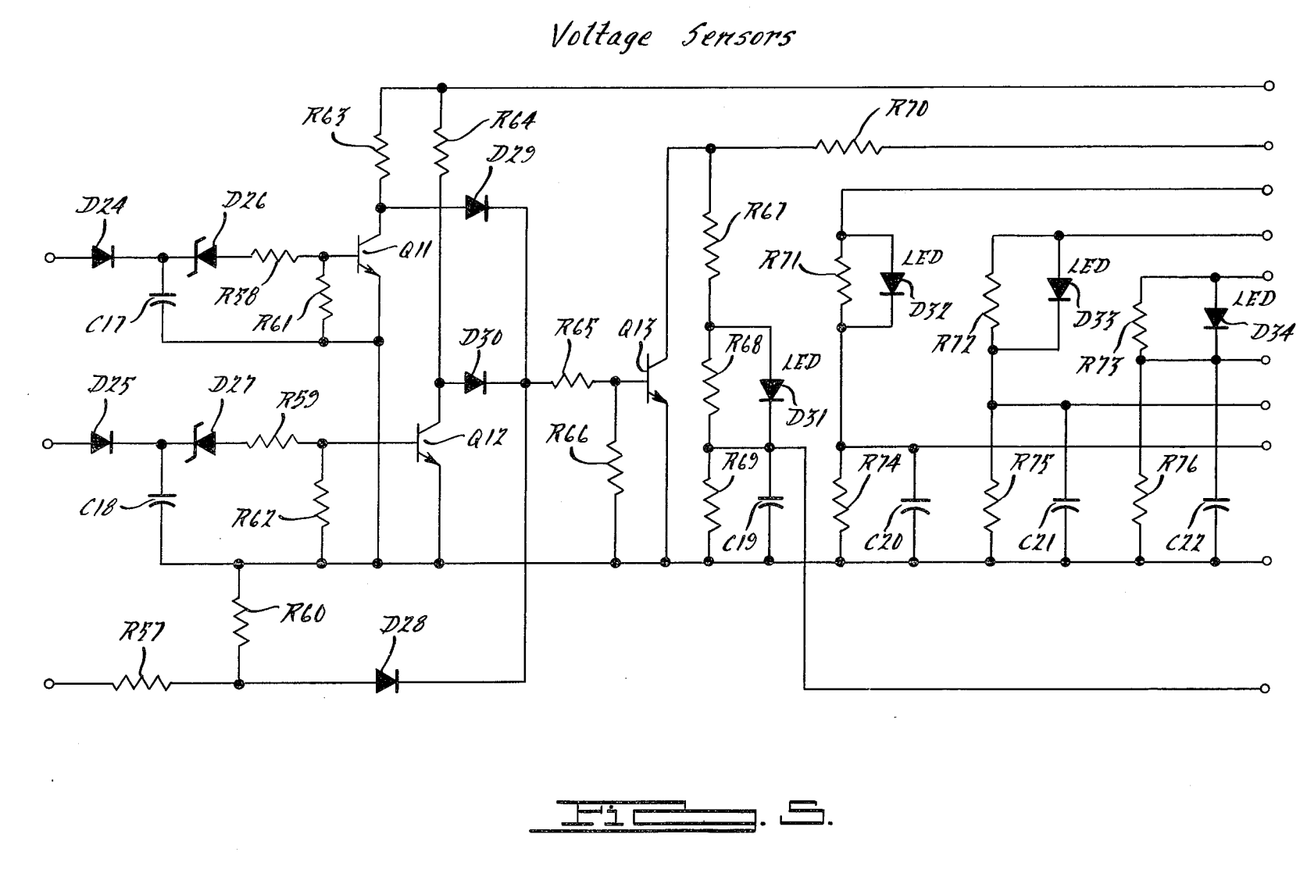
FIG. 5 is a circuit diagram of the voltage sensors of the control circuit of the present invention.
Figure 6A:
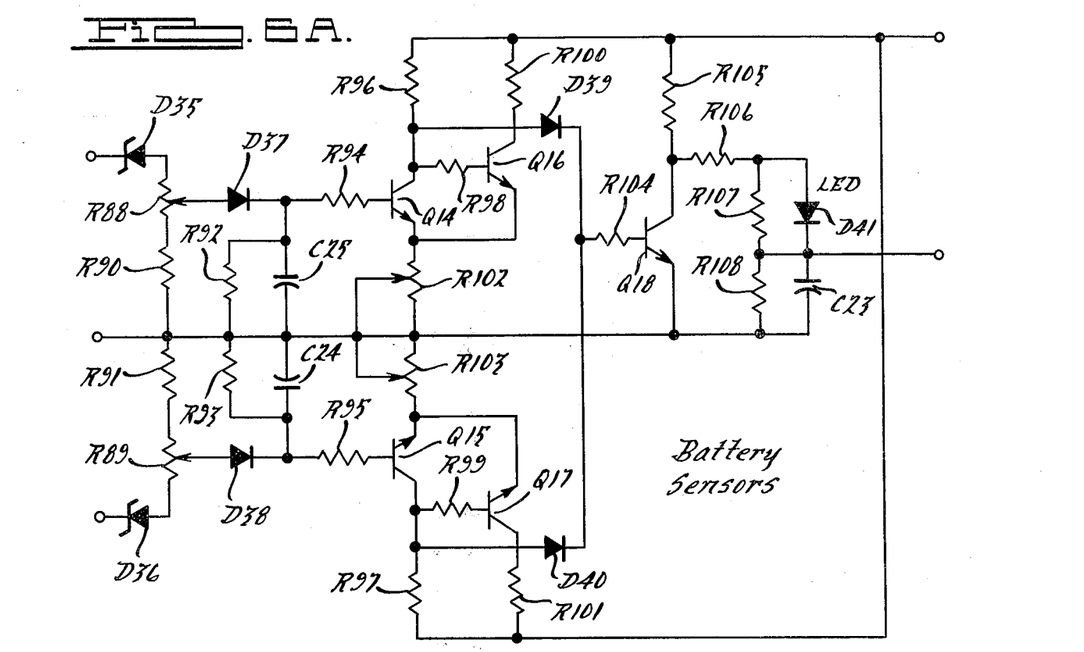
FIGS. 6a-b are circuit diagrams of the battery sensors of the control circuit of the present invention.
Figure 6B:
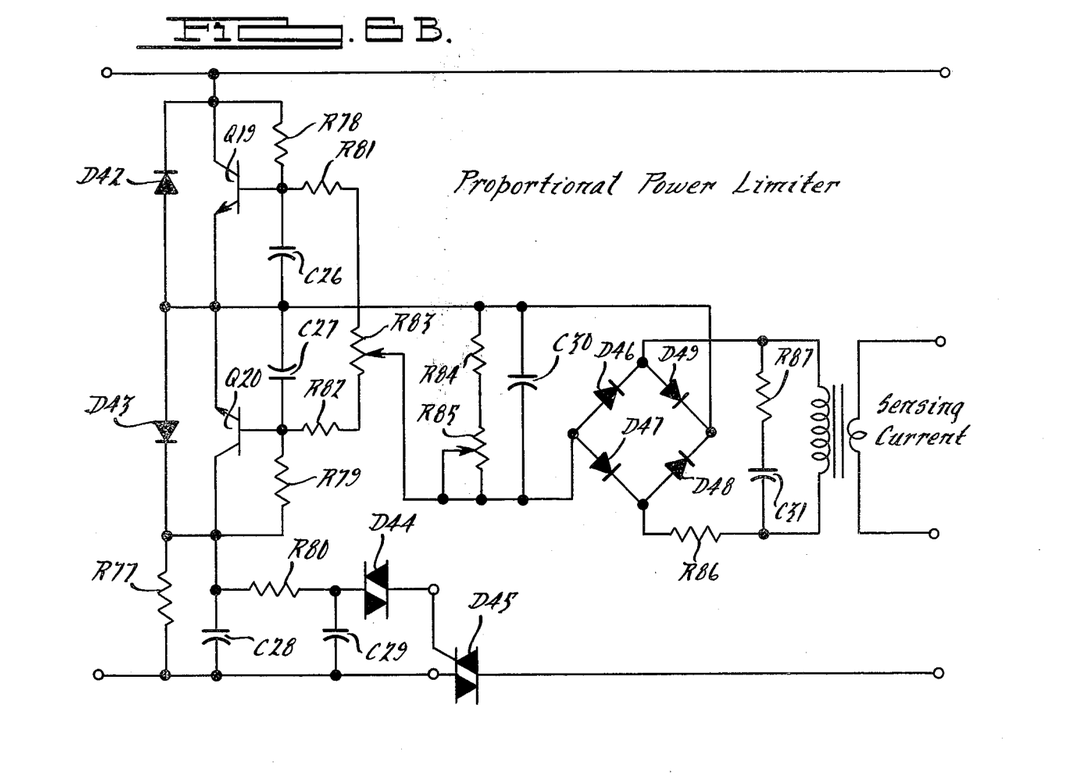
Figure 7A:
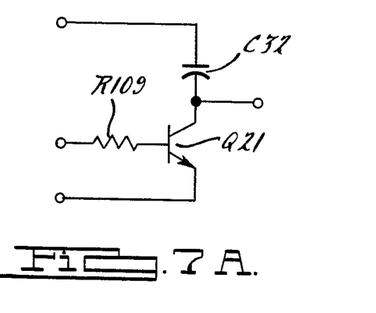
FIGS. 7a-d are circuit diagrams of the inverter/oscillator and charger control circuits of the present invention.
Figure 7B:
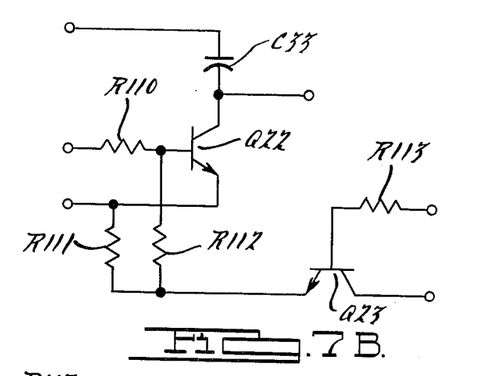
Figure 7C:
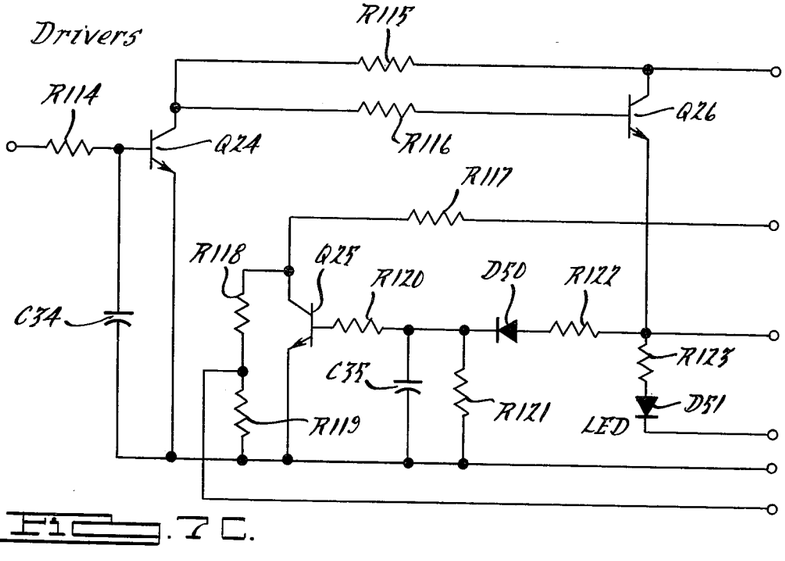
Figure 7D:
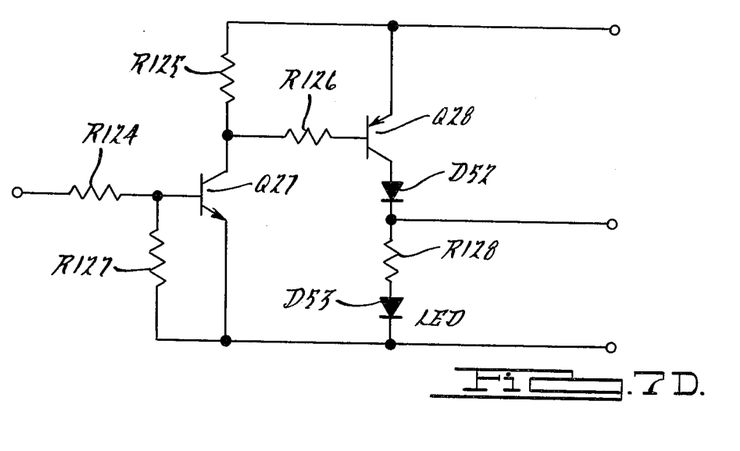
Figure 8A:
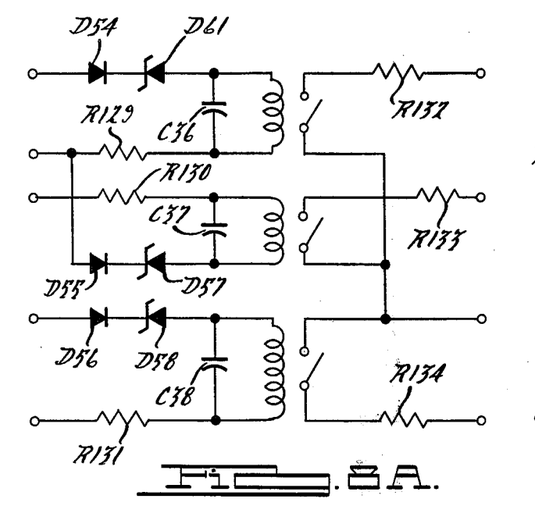
FIGS. 8a-b are circuit diagrams of the drivers of the control circuit of the present invention.
Figure 8B:
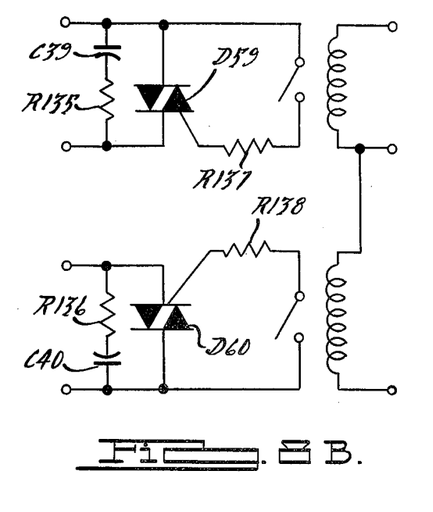
Figure 9:
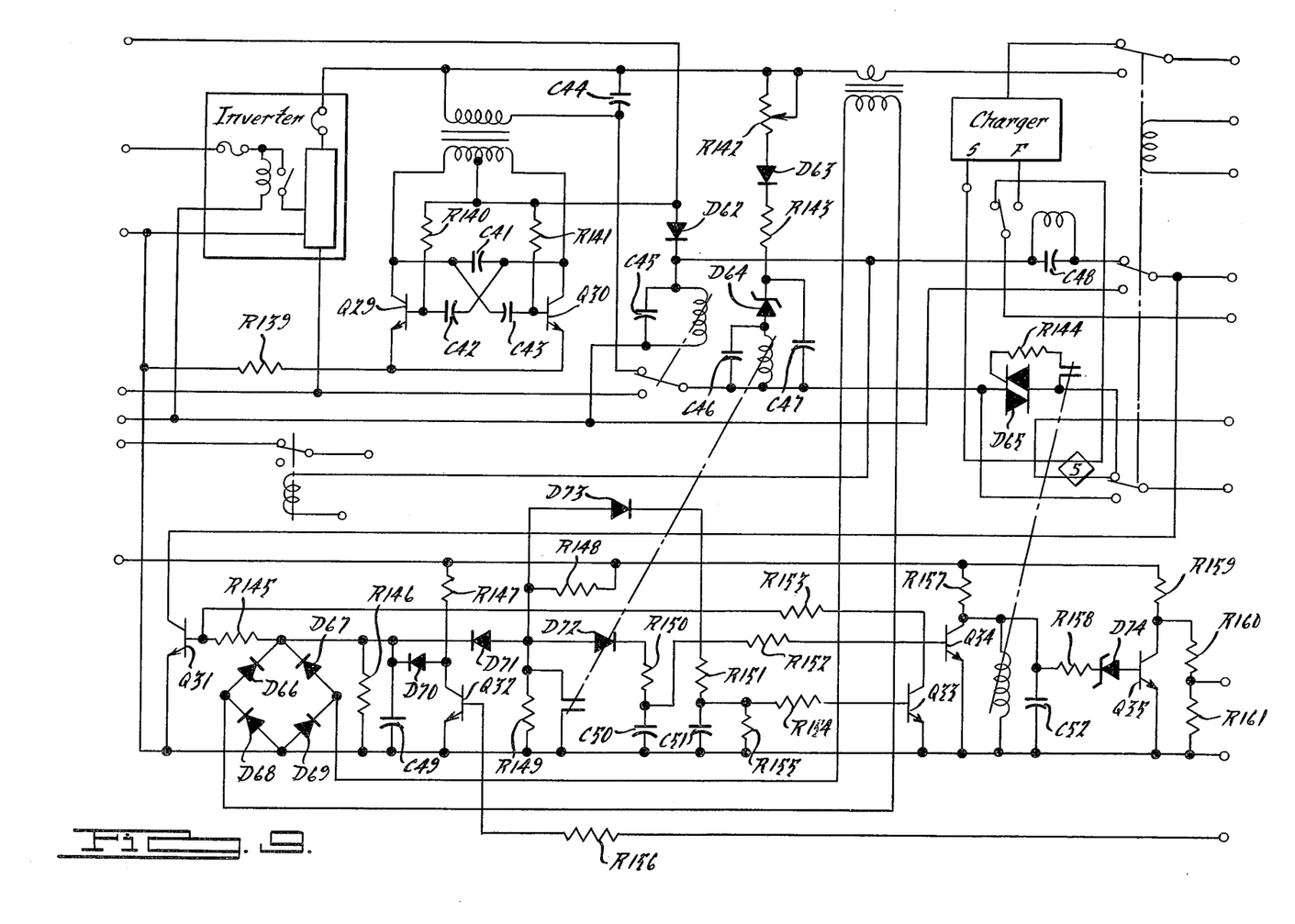
FIG. 9 is a circuit diagram of the high/low voltage interfacing circuits of the present invention.

Should the load sensed by the sensor 14, which caused operation of the inverter portion of the inverter/oscillator 16, exceed the capacity of the inverter portion, e.g., a load in excess of three amps, the inverter overload detector 56 will provide a signal to the gate of the triac 58 to disconnect the inverter relay 54 and prevent damage to the inverter/oscillator 16. This signal is also sent to the OR gate 18 so as to initiate operation of the motor generator 14. As will be explained hereinafter, even though the inverter relay 54 is disconnected to disconnect line L1, the TV/priority line continues to be powered by the inverter. During operation of the motor generator, loads above three amperes are detected by the sensor 5 so as to maintain the operation of the motor generator during such loads. When the load falls below the inverter capability, i.e., below three amps as detected by the sensor 5, the signal from the sensor 5 is terminated so as to shut down the motor generator 14, under the control of the timers 20 and 22, and to re-engage the inverter relay 54 to again connect the inverter to the line L1 of the recreational vehicle. Note that the signal from the sensor 5 is inhibited by a signal from a land line sensor 1 so that the motor generator is shut down when the land line is connected as detected by sensor 1.

As previously stated, upon an inverter overload sensed by the inverter overload circuit 56, the inverter is disconnected from the recreational vehicle line L1 but remains connected to the TV/priority line. However if an inverter overload is still experienced after disconnection of the line L1, i.e., due to an overload on the TV/priority line, a time delay circuit 60 senses the continued overload for a given time period, e.g., one second, to supply a signal to AND gate 48 which disconnects the inverter/oscillator relay 52 and which shuts down the inverter to prevent damage due to the overload. The time delay signal is not provided in the absence of the continued overload so that the input function to the AND gate is a NOT function. Consequently, the signal through the AND gate 48 from the OR gate 46 is inhibited during the existence of an output signal from the time delay 60.

The motor generator for which the system 10 has been designed incorporates a blower which is on when the motor generator 14 is on. The blower is used to cool the motor generator. This blower consumes approximately five amps. Therefore, it will be appreciated that the circuit as presently described would sense the five amp current of the motor generator blower as a load in excess of the three amps permitted for inverter operation, and therefore, would leave the generator in operation indefinitely. To prevent this, the system 10 is provided with a provision for subtracting the blower current from the overall current sensed by the system 10 so that its effect will not be counted (except in the event of air conditioning operation as will be described). This system includes an AND gate 62 which receives a signal from a sensor 13 which indicates that the motor generator 14 is in operation and supplying current to the recreational vehicle. The AND gate 62 also receives a signal from a sensor 7 which indicates that the air conditioner is not in operation. When the motor generator 14 is in operation as indicated by the signal from sensor 13, and the air conditioner is not operating as indicated by sensor 7, a signal is set by AND gate 62 to a sensor 5 which is effective to subtract the blower current from the load current. Sensor 5 additionally functions to sense the current of the lower line L1 so that its net output is indicative of current loads above the blower motor load when the motor generator 14 is operative. Hence, sensor 5 does not respond to a load resulting solely from the operation of the motor generator blower.

When the air conditioning unit is in operation, the same blower motor is used. In this instance, it is important to consider the blower motor as a load since it is needed for air conditioning purposes. This provision has the following important aspects. It will be appreciated that normally the air conditioning compressor will require more than the five amps, i.e., the current which is subtracted from the signal when the air conditioning unit is not operating. Consequently, it is expected that the subtraction of five amps of current during air conditioning operation would not normally affect the operation of the system. However, the air conditioning compressor can be designed to cycle on and off while the blower motor continues in operation. In such cases, subtraction of the five amps current during AC operation may result in undesirable cycling from motor generator to inverter. Furthermore, it is possible that the land line capacity will not allow the use of the air conditioning. Consequently, the system 10 will start the motor generator to operate the air conditioning. It is quite possible that if five amps are subtracted from the air conditioning load, system 10 would then be "fooled" into thinking that the land line capacity was adequate and therefore inappropriately switch to land line operation.

Should the power demand decline below three amps, as sensed by the three amp current sensor 5, the signal from sensor 5 will terminate to shut down the motor generator 14 and to reactivate the inverter/oscillator 16.

Continuing with the presumption that the recreational vehicle's electrical load is sufficiently small that it can be accommodated by inverter/oscillator 16, it will be appreciated that the batteries will be gradually discharged as the inverters operate. Sensors 11 and 12 are provided to sense the voltage of first and second batteries of the recreational vehicle, respectively. Once sensors 11 or 12 indicate a low battery charge level, e.g., indicated by a low battery voltage, a signal is sent to the AND gate 66 to cause start-up of the motor generator 14 via the OR gate 18, timers 20 and 22, OR gate 24, and driver 26. When the motor generator 14 is in full operation as indicated by sensor 13, the inverter is disconnected (by a circuit shown in FIG. 2) and the charger 68 is activated. The motor generator is shut down if the land line is connected, as detected by sensor 1, and the batteries are thereupon charged by the land line connection. Note that the charger 68 is activated by virtue of a signal received from the battery charge level sensors 11 and 12 via AND gate 70 and charger driver 72. A circuit 73 is provided from the inverter relay 54 to the second input of the AND gate 70 to prevent operation of the charger 68 in the event that the power is being supplied by the inverter/oscillator 16 since it would be inappropriate to use the inverter output in an attempt to charge the batteries.

The battery charge level sensors 11 and 12 are preferably two level sensors. Particularly, when the battery charge falls below a first or upper level of charge, the charger 68 will be activated so long as the recreational vehicle is receiving its power from the land line or motor generator. However, should the vehicle be in inverter operation, the charge on the batteries is allowed to fall to a second lower level of charge before the inverter operation is terminated and the batteries recharged by motor generator operation as described above. Furthermore, the charger 68 is designed to provide a trickle charge for the batteries even if the battery charge level sensors 11 and 12 indicate full charge so long as the recreational vehicle is connected to land line or motor generator power.

With reference again to FIG. 2, a block diagram of the control circuit is shown. As can be seen in FIG. 2, the circuit includes the interlocked land line contactor 30 and the motor generator contactor 36 including the various switch positions for the inverter/oscillator mode. Also shown in the figure is a three-part, mechanically-coupled selector switch 74a–c which allows selection between the off position, the automatic mode of operation as described above and two manual modes, (1) manual land line or (2) manual motor generator, with each position appropriately labeled in the figure. While the land line position provides a direct connection to the land line so long as the switch is in the land line position, the motor generator position does not provide such direct connection. Rather, before the motor generator may be connected to supply power to the recreational vehicle, the temperature and RPM constraints of the sensor 13 must be met. As a result of switch 74, the recreational vehicle user has the option of selecting its own power source in the event of failure of the automatic mode or in accord with user preference.

Although the diagram of FIG. 2 is self-explanatory in view of the above description, special attention is called to the operation of the inverter/oscillator circuit and the TV/priority line. Note that the inverter/oscillator 16 is normally connected to the vehicle line 11 through a triac 58. Triac 58 has its control terminal connected to the inverter overload detector 56 so that the triac 58 is opened in the event of an inverter overload. However, the inverter is also connected to the TV/priority line through a relay switch 54a. The switch 54 is normally in the up position as shown and is pulled to the down position by power supplied from the inverter relay driver 40 via the motor generator contactor 36 when the inverter is operating. It should be noted that the inverter operates when there is a load demand but neither land line nor motor generator power is necessary to supply the load. When the vehicle is being supplied with land line or motor generator power, the switch is returned to the up position. In the up position, the TV/priority line is supplied directly from the land line or motor generator as illustrated. When the system 10 is in inverter operation, i.e., the switch 54 is in the down position, the inverter supplies power to the lower line L1 and the TV/priority line. Consequently, any loads connected to those lines would be supplied by the inverter. Normally, only high priority loads such as essential monitoring instruments, blower(s) and/or television sets (TV) are connected to the TV/priority line. Should a power overload occur, the inverter overload detector 56 removes the gate signal from the triac 58 thereby turning the triac off to disconnect line L1 from the inverter and isolate line L1 from the TV/priority line. The TV and other essential loads continue to be supplied by the inverter so that operation of essential loads is not interrupted in the event of an inverter overload.

As previously stated, the sensor 5 functions as the current sensor for the vehicle line L1. Also, as previously stated, the sensor 5 is designed to maintain motor generator power when the load on line L1 and the TV/priority line exceeds three amps. However, the inverter is capable of providing current above its rated capacity for a short period of time. Therefore, the sensor 5 of the system 10 has been designed to ignore the inverter current so that the system 10 will not switch from inverter operation to motor generator operation for nominal short overloads of the inverter. To accomplish this, the sensor is designed to subtract inverter current from sensed current. This is achieved since the inverter current on line 78 flows through the sensor 5 in the direction of arrow 80 and then through line 82 in the direction of arrow 84. This two-way passage through the sensor 5 subtracts the inverter current from that current which is sensed by sensor 5. In other words, it makes sensor 5 insensitive to inverter current.

Note also that the current to the TV/priority line is not sensed by sensor 5 when in the inverter mode since the connecting line 86 for the TV/priority line bypasses the sensor 5. Should the inverter encounter a more severe overload, its operation is interrupted by the inverter overload detector 56.

When the TV/priority line and line L1 are being supplied by the land line or generator, the path for same is in one direction through sensor 5 on line 82, and therefore, loads on the line L1 and the TV/priority line are sensed by sensor 5 when such loads are supplied by the land line or motor generator.

With reference to FIG. 2, it can be seen that the inverter contacts are closed whenever the land line contacts 30 and the motor generator contacts 36 are open. Therefore, the inverter/oscillator 16 is automatically placed in operation where there is neither land line nor motor generator power being supplied to the vehicle. Consequently, when the excess demand sensor 6 results in a disconnection of the land line, the inverter automatically supplies power to lines L1 and the TV/priority line. Should line L1 then overload the inverter, the triac 58 is interrupted to isolate the TV/priority line. Consequently, on interruption of the land line connection due to an excessive power demand, the TV/priority line is supplied power by the inverter/oscillator 16.

A summary of the various sensors described herein is as follows:

1. Lower land line voltage sensor—senses land line voltage between L1 and N.
2. (None).
3. Upper land line voltage sensor—senses land line voltage between L2 and N.
4. Upper vehicle line current sensor—senses the current in vehicle line L2.
5. Lower vehicle line current sensor—determines when the current in vehicle line L1 exceeds three amperes, except that the sensor 5 is defeated when the system 10 is in inverter operation by subtracting the inverter current from vehicle line L1 current.
6. Adjustable vehicle line current sensor—presettable between fifteen and thirty emperes demand for transferring power from land line to generator upon excessive demand.
7. Vehicle air conditioning sensor—senses operation of vehicle air conditioner(s).
8. 220/240 volt power demand sensor—senses vehicle load placed across vehicle lines L1 and L2.
9. Upper line power demand sensor—senses vehicle load placed across vehicle lines L2 and N.
10. Thermostat—senses temperature of area in vehicle to be heated.
11. Battery No. 1 charge level sensor—senses two levels of charge in battery No. 1, i.e., a higher charge level and a lower charge level.
12. Battery No. 2 charge level sensor—senses two levels of charge in battery No. 2, i.e., a higher charge level and a lower charge level.
13. Motor generator operation sensor—senses proper level of operation of motor generator by sensing motor generator speed and temperature.
14. Inverter/oscillator voltage sensor—senses operation of inverter by sensing 110/120 volt output of inverter or oscillator.
15. Inverter load sensor—senses a load on inverter by sensing inverter output current.

A summary of the operating conditions of the system 10 is as follows:

I. If the vehicle is connected to a 220/240 volt land line (three conductor land line):
  A. The motor generator is started and the power supply is automatically transferred from the land line to the motor generator if:
   (1) A load demand occurs in excess of the preset land line capability, or
   (2) A heat demand occurs, and
   (3) The motor generator reaches proper operating conditions.
  B. The motor generator is stopped and the power supply is automatically returned from the motor generator to the land line if:
   (1) The load demand declines below the preset land line capability, and
   (2) There is no heat demand, and
   (3) The timing conditions of the first and second timers 20 and 22 are satisfied.
II. If the vehicle is connected to a 110/120 volt land line (two conductor land line):
  A. The motor generator is started and the power supply is automatically transferred from the land line to the motor generator if:
   (1) A load demand occurs in excess of the preset land line capability, or
   (2) A load demand occurs on the vehicle upper line L2 (either a 110/120 volt load on the upper line L2 or a 220/240 volt load), or
   (3) A heat demand occurs, and
   (4) The motor generator reaches proper operating conditions.
  B. The motor generator is stopped and the power supply is automatically returned from the motor generator to the land line if:
   (1) The load demand declines below the preset land line capability, and
   (2) The load demand on the vehicle upper line L2 terminates, and
   (3) There is no heat demand, and
   (4) The timing conditions of the first and second timers 20 and 22 are satisfied.
III. If the vehicle is not connected to a land line:
  A. The inverter operates and supplies power to vehicle line L1 and the TV/priority line if:
   (1) A load is sensed by the oscillator circuit portion, and
   (2) There is no load on the upper vehicle line L2 (neither a 110/120 volt load on the upper line L2 nor a 220/240 volt load), and
   (3) The charge level of the batteries is adequate, i.e., above the lower charge level.
  B. The inverter operates but is disconnected from lower vehicle line L1 if:
   (1) An excessive inverter load is detected by the inverter overload detector 56, or
   (2) After disconnection of the land line due to a load demand in excess of the preset land line capability.
  C. The inverter operation terminates if:
   (1) The land line is connected to the vehicle, or
   (2) The motor generator is operational and connected.
  D. Motor generator operation is initiated if:
   (1) An excessive inverter load is detected by the inverter overload detector 56, or
   (2) A load demand occurs on the vehicle upper line L2 (either a 110/120 volt load on the upper line L2 or a 220/240 volt load), or
   (3) A low battery charge level is detected by the battery charge level sensors 11 and 12.
  E. The motor generator is stopped and the system 10 returns to inverter or oscillator operation if:
   (1) The load demand declines below the inverter capability, and
   (2) The load demand on the vehicle upper line L2 terminates, and
   (3) The battery charge level exceeds the upper charge level detected by sensors 11 and 12, and
   (4) There is no heat demand, and
   (5) The timing conditions of the first and second timers 20 and 22 are satisfied.
  F. The motor generator is stopped and the system 10 returns to land line operation if:
   (1) The land line is connected, and
   (2) There is no load demand above the inverter capability, and
   (3) There is no load on vehicle upper line L2, and
   (4) There is no heat demand, and
   (5) The timing conditions of the first and second timers 20 and 22 are satisfied.

The logic circuits used by the system 10 are illustrated in detail in FIGS. 3–9. Although it is believed that the description appearing hereinabove is adequate to enable anyone skilled in the art to make and use the present invention and discloses the best mode contemplated by us for carrying out our invention, these circuits are provided as additional teachings. The component values selected by this circuit are as follows:

| Diodes (D) | Resistors (R) | Capacitors (C) | Transistors (Q) |
|---|---|---|---|
| 1,2-MPD200 | 1-100 | 1-0.18mfd. | 1-2N5305 |
| 3,4-LED | 2-410 | 2-50mfd. | 2-2N5305 |
| 5-MPD200 | 3-390 | 3-0.01mfd. | 3,4-2N5305 |
| 6-13-IN4004 | 4-100K | 4-0.47mfd. | 5-2N5355 |
| 14-LED | 5-2.2M | 5-50mfd. | 6-2N5305 |
| 15-MPD200 | 6-13-10K | 6-470mfd. | 7-2N5355 |
| 16-17-IN4761 | 14-560K | 7,8-0.68mfd. | 8-2N5305 |
| 18-IN4738A | 15-20K | 9-220mfd. | 9-2N5355 |
| 19,20-LED | 16-1K | 10,11-50mfd. | 10-2N5305 |
| 21-MPD200 | 17-290 | 12-50mfd. | |
| 22-LED | 18-100 | 13,14-100mfd. | |
| 23-IN4004 | 19-910 | 15,16-100mfd. | |
| | 20-470K | | |
| | 21-10K | | |
| | 22-750K | | |
| | 23,24-2.4K | | |
| | 25,26-10K | | |
| | 27-100K | | |
| | 28,29-120K | | |
| | 30-1.5K | | |
| | 31,32-100K | | |
| | 33-50K | | |
| | 34-33K | | |
| | 35-100K | | |
| | 36,37-1K | | |
| | 38-15K | | |
| | 39-100 | | |
| | 40-910 | | |
| | 41,42-390 | | |
| | 43-910 | | |
| | 44-100 | | |
| | 45-15K | | |
| | 46-2.2K | | |
| | 47-50K | | |
| | 48-2.2K | | |
| | 49-15K | | |
| | 50-39K | | |
| | 51-620K | | |
| | 52-1.5K | | |
| | 53-560 | | |
| | 54-1K | | |
| | 55-270K | | |
| | 56-2.2M | | |
| 24,25-IN4004 | 57-2.4K | 17,18-20mfd. | 11,12-2N5305 |
| 26,27-IN4738A | 58,59-43K | 19-22-100mfd. | 13-2N3414 |
| 28-MPD200 | 60-1K | 23-100mfd. | 14,15-2N5305 |
| 29,30-MPD200 | 61,62-240K | 24,25-22mfd. | 16,17-2N3414 |
| 31-34-LED | 63,64-10K | 26,27-.047mfd. | 18-20-2N3414 |
| 35,36-IN4738A | 65-10K | 28-0.1mfd. | |
| 37,38-IN4004 | 66-100K | 29-.047mfd. | |
| 39,40-MPD200 | 67-680 | 30-100mfd. | |
| 41-LED | 68-910 | 31-0.1mfd. | |
| 42,43-IN4004 | 69-390 | | |
| 44-IN5761A | 70-220 | | |
| 45-SC266B | 71-73-910 | | |
| 46-49-IN4004 | 74-150 | | |
| | 75,76-390 | | |
| | 77-100K | | |
| | 78,79-100K | | |
| | 80-5.6K, 1W | | |
| | 81,82-5.6K | | |
| | 83-5K | | |
| | 84-820 | | |
| | 85-1K | | |
| | 86-1.5K | | |
| | 87-2.7K | | |
| | 88,89-5K | | |
| | 90,91-1K | | |
| | 92-95-100K | | |
| | 96-99-10K | | |
| | 100,101-1K | | |
| | 102,103-250 | | |

-continued

| Diodes (D) | Resistors (R) | Capacitors (C) | Transistors (Q) |
|---|---|---|---|
| | 104-22K | | |
| | 105-220 | | |
| | 106-680 | | |
| | 107-910 | | |
| | 108-390 | | |
| 50-IN4004 | 109-10K | 32,33-50mfd. | 21-2N3414 |
| 51-MY55 | 110-10K | 34-100mfd. | 22-2N3414 |
| 52-3BF1 | 112-10K | 35-10mfd. | 23-2N3414 |
| 53-MY55 | 113-100K | 36-38-150mfd. | 24-2N3414 |
| 54-56-IN4004 | 114-10K | 39,40-0.1mfd. | 25-2N3414 |
| 57,58-2VR120A | 115-390 | 41-10mfd. | 26-D40K1 |
| 59,60-8400624 | 116-1K | 42,43-0.55mfd. | 27-2N3414 |
| 61-2VR120A | 117-39K | 44-0.33mfd. | 28-D41K1 |
| 62-IN4004 | 118-82 | 45-22mfd. | 29-2N6383 |
| 63-IN4004 | 119-220 | 46-220mfd. | 30-2N6383 |
| 64-IN4761 | 120-6.8K | 47-20mfd. | 31-D40K1 |
| 65-SC250D | 121-43K | 48-150mfd. | 32-2N5305 |
| 66-69-IN4004 | 122-10K | 49-9mfd. | 33-2N5305 |
| 70-71-IN4004 | 123-2K | 50-100mfd. | 34-2N5305 |
| 72-MPD200 | 124-10K | 51-470mfd. | 35-2N3414 |
| 73-MPD200 | 125-1K | 52-50mfd. | |
| 74-IN4733A | 126-39K | | |
| | 127-10K | | |
| | 128-2K | | |
| | 129-520 | | |
| | 130-520 | | |
| | 131-520 | | |
| | 132-100 | | |
| | 133-100 | | |
| | 134-100 | | |
| | 135,136-100,1W | | |
| | 137,138-1K | | |
| | 139-10,10W | | |
| | 140,141-43K | | |
| | 142-5K | | |
| | 143-1K | | |
| | 144-1K | | |
| | 145-39K | | |
| | 146-120K | | |
| | 147-10K | | |
| | 148-3.5K | | |
| | 149-8.2K | | |
| | 150-1K | | |
| | 151-36K | | |
| | 152-1M | | |
| | 153-10 | | |
| | 154-1M | | |
| | 155-470K | | |
| | 156-330K | | |
| | 158-10K | | |
| | 159-1K | | |
| | 160-1K | | |
| | 161-2.4K | | |

Figure 10:
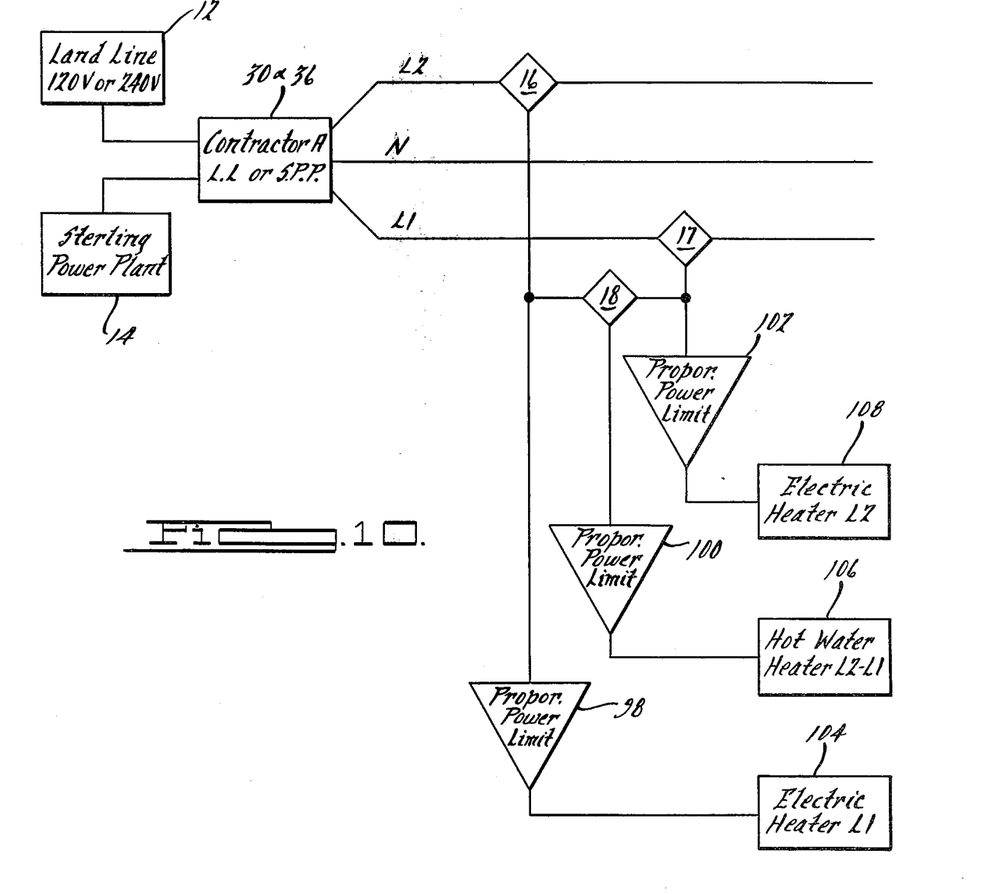
FIG. 10 is a block diagram of an alternative form of a portion of the present invention.

In FIG. 10, an alternative embodiment of the present invention is illustrated. In the figure, the land line 12 and the motor generator 14 are illustrated as being connected to the contactors 30 and 36. Also shown in the figure is the upper line L2, the neutral line N and the lower line L1. The upper line L2 is provided with a current or load sensor 16 and the lower line L1 is provided with a similar current or load sensor 17. The sensors 16 and 17 are connected to a total current or total load sensor 18 which detects the total of the loads detected by sensors 16 and 17. Sensor 16 is connected to a proportional power limiter 98, sensor 18 is connected to a proportional power limiter 100 and sensor 17 is connected to a proportional power limiter 102. The proportional power limiters 98-102 are connected to various electric heating devices such as an electric space heater 104, a hot water heater 106 and an electric space heater 108, respectively. The proportional power limiters 98-102 are adapted to reduce the power supplied to the respective heater 104-108, by reducing the voltage supplied thereto, in accordance with the load signal provided to it from load sensors 16, 18 and 7, respectively. For example, each proportional power limiter 98–102 can be a controllable, variable duty cycle device along the lines of a "light dimmer". The power reduction is established to prevent the total power drawn by the system 10 from exceeding the capability of the land line 12 or the motor generator 14, whichever is in operation. In other words, the power is reduced an amount proportional to the amount of load detected by the load sensors 16–18 as the load approaches the maximum capability of the land line 12 or the motor generator 14. Each power limiter 98-102 can operate independently, for example, to control only one line L1 or L2 if only the power on the one line nears the maximum capability for that line.

It should be noted that the proportional power limiters 98–102 are only connected to loads which are not sensitive to the voltage reduction provided thereby. Such loads are ideally heater loads. Loads such as electric motors for refrigerators or the like should not be connected to a proportional power limiter since such loads can be damaged by the reduction in voltage.

It will be appreciated that the term "recreational vehicle" used herein means motor vehicles, air vehicles and land vehicles for recreational as well as non-recreational uses. Furthermore, the system 10 can be used with power using facilities other than recreational vehicles. All values given are exemplary and are not to be taken as limiting the invention.

Although the control system 10 is presently constructed using discrete circuitry, it is contemplated that the control functions of the control system 10 will be implemented using a microprocessor. Hence, the invention should not be limited to implementations using discrete circuitry but should be interpreted to include microprocessor adaptations of the control system 10 as well.

What is claimed is:

1. A system for controlling the AC power supply to a recreational vehicle between an AC land line and an auxiliary-motor-driven AC generator on said recreational vehicle, said land line having an interrupter which interrupts said land line at a predetermined power supply level which is less than the power supply capability of said AC generator, the improvement comprising:
    power transfer means being presettable at a power demand level correlative to but less than said predetermined power supply level, said power transfer means being adapted for electrically disconnecting said land line from said recreational vehicle and for transferring the power supply for said recreational vehicle to said AC generator when said AC power demanded by said recreational vehicle exceeds said preset power demand level and prior to interruption of said land line by said interrupter.

2. A system according to claim 1 wherein said interrupter is designed to prevent overload of said land line and is located remotely of said recreational vehicle.

3. A system according to claim 2 wherein said power transfer means is further adapted for electrically reconnecting said land line to said recreational vehicle after said power demanded by said recreational vehicle no longer exceeds said preset power demand level.

4. A system according to claim 1 wherein said power transfer means includes manual means for presetting said power transfer means at selectable power demand levels.

5. A system for a recreational vehicle incorporating an inverter for providing AC power of limited power level from the vehicle battery, an auxiliary-motor-driven AC generator on said recreational vehicle for providing a relatively greater level of power, a primary AC power line and a priority AC power line for connection to priority AC power loads, the improvement comprising:
    sensing means for sensing an AC power demand in excess of the limited power level of said inverter; and
    power transfer means for normally connecting the inverter to said primary AC power line and said priority AC power line and, in response to said sensing means sensing an AC power demand exceeding said limited power level of said inverter, for disconnecting said inverter from said primary AC power line while maintaining the connection of said inverter to said priority AC power line so that said inverter continues to supply AC power to said priority AC power line, said power transfer means further initiating operation of said AC generator in response to said sensing means sensing an AC power demand exceeding said limited power level of said inverter for supplying AC power to said primary AC power line.

6. A system according to claim 5 wherein said power transfer means electrically disconnects said inverter from said priority AC power line and connects said AC generator to said priority AC power line when said AC generator is operating to provide AC power.

7. A system for a recreational vehicle incorporating an inverter for providing AC power of limited power level from a vehicle battery, an auxiliary-motor-driven AC generator for providing a relatively greater level of AC power, the improvement comprising:
    battery charge level sensing means for determining when the charge level of said vehicle battery falls below a predetermined charge level;
    power transfer means for normally connecting said inverter to provide power to said recreational vehicle and being responsive to said predetermined battery charge level sensing means for transferring the power supply for said recreational vehcle from said inverter to said AC generator when said battery charge level falls below said predetermined battery charge level; and
    battery charging means electrically connected to receive said AC power from said AC generator and for charging said vehicle battery when said battery charge is below a predetermined upper battery charge level which is greater than said first-mentioned predetermined battery charge level so that, upon transferring the power supply for said recreational vehicle from said inverter to said auxiliary source when said battery charge falls below said first-mentioned predetermined battery charge level, said battery charging means will charge said vehicle battery until said battery charge level reaches said predetermined upper battery charge level.

8. A system according to claim 7 wherein said power transfer means is further responsive to said predetermined upper battery charge level for transferring the power supply for said recreational vehicle from said AC generator to said inverter when said battery charge level reaches said predetermined upper battery charge level.

9. A system for controlling the AC power supplied to a recreational vehicle having a predetermined load with respect to which the power supplied thereto may be varied without damage thereof comprising:

power sensing means for sensing the power demanded by said recreational vehicle;

power controlling means responsive to said power sensing means for partially reducing the power supplied to said predetermined load when the power demanded by said recreational vehicle approaches a predetermined maximum power supply level so that said predetermined load continues to receive partial power but the power supplied to said recreational vehicle does not exceed said predetermined maximum power supply level.

10. A system according to claim 9 wherein said predetermined load is a heater load.

11. A system according to claim 9 wherein said recreational vehicle has another load which may be damaged by a reduction in the power supplied thereto and wherein said power controlling means does not reduce the power supplied to said another load at any time including times when said power controlling means reduces the power supplied to said predetermined load.

12. A system for controlling the AC power supplied to a recreational vehicle between a primary AC power source of predetermined power supply capability and an auxiliary-motor-driven AC generator on said recreational vehicle, said recreational vehicle having an auxiliary AC load which receives power whenever said AC generator is operated comprising:

sensing means for sensing when the AC power demanded by said recreational vehicle exceeds said predetermined power supply capability of said primary AC power source and for further sensing when the AC power demanded by said recreational vehicle declines to a power demand level within said power supply capability of said primary AC power source, said sensing means including means for distinguishing the power demanded by said auxiliary AC load from other AC power demands so as to exclude said power demanded by said auxiliary AC load when sensing the AC power demanded by said recreational vehicle;

power transfer means responsive to said sensing means for transferring the power supply for said recreational vehicle from said primary AC power source to said AC generator when said sensing means senses that said power demanded by said recreational vehicle exceeds said predetermined power supply capability of said primary AC power source, said transfer of the power supply for said recreational vehicle to said AC generator causing said auxiliary AC load to be energized by said AC generator, said power transfer means being further responsive to said sensing means for transferring the power supply for said recreational vehicle from said AC generator to said primary AC power source when said sensing means senses that the power demanded by said recreational vehicle declines below said predetermined power supply capability of said primary AC power source, but exclusive of said power demanded by said auxiliary AC load.

13. A system according to claim 12 wherein said auxiliary AC load is an electric motor for cooling said AC generator.

14. A system according to claim 12 wherein said sensing means subtracts the power demanded by said auxiliary AC load from said other AC power demands.

* * * * *